(12) United States Patent
Karlsen et al.

(10) Patent No.: US 7,867,757 B2
(45) Date of Patent: Jan. 11, 2011

(54) FLUID MANIPULATION IN A MICROFABRICATED REACTION CHAMBER SYSTEMS

(75) Inventors: Frank Karlsen, Klokkarstua (NO); Klaus Drese, Mainz (DE); Olaf Sorensen, Mainz (DE)

(73) Assignee: Norchip AS (NO)

( * ) Notice: Subject to any disclaimer, the term of this patent is extended or adjusted under 35 U.S.C. 154(b) by 1669 days.

(21) Appl. No.: 10/498,827

(22) PCT Filed: Dec. 30, 2002

(86) PCT No.: PCT/GB02/05945

§ 371 (c)(1),
(2), (4) Date: Nov. 17, 2004

(87) PCT Pub. No.: WO03/060157

PCT Pub. Date: Jul. 24, 2003

(65) Prior Publication Data

US 2005/0089863 A1    Apr. 28, 2005

(30) Foreign Application Priority Data

Dec. 28, 2001    (GB) .................................. 0131061.4
Nov. 1, 2002     (GB) .................................. 0225539.6

(51) Int. Cl.
*C12M 3/00*    (2006.01)
*C12M 1/34*    (2006.01)

(52) U.S. Cl. .................................. 435/287.2

(58) Field of Classification Search ................ 435/287.2
See application file for complete search history.

(56) References Cited

U.S. PATENT DOCUMENTS

| | | | |
|---|---|---|---|
| 5,587,128 A | 12/1996 | Wilding et al. | |
| 5,674,742 A | 10/1997 | White et al. | |
| 6,979,424 B2* | 12/2005 | Northrup et al. | 422/50 |
| 2001/0029983 A1 | 10/2001 | Unger et al. | 137/597 |
| 2001/0036672 A1 | 11/2001 | Anderson et al. | 436/180 |

FOREIGN PATENT DOCUMENTS

| | | |
|---|---|---|
| WO | 99 09042 A | 2/1999 |
| WO | 00 62039 A | 10/2000 |
| WO | 01/00523 A1 | 4/2001 |
| WO | 02 22265 A | 3/2002 |

OTHER PUBLICATIONS

Jager, E.W.H. et al.: "Microfabricating conjugated polymer actuators", Science, Nov. 24, 2000, vol. 290, No. 5496, pp. 1540-1545, XP002256347.

(Continued)

*Primary Examiner*—Walter D Griffin
*Assistant Examiner*—Lydia Edwards
(74) *Attorney, Agent, or Firm*—Bacon & Thomas, PLLC

(57) ABSTRACT

The present invention relates to a microfabricated reaction chamber system and a method of fluid transport. The system may be used, for example, in a method of carrying out a nucleic acid sequence amplification and detection process on a nucleic acid sample. The microfabricated chamber system comprises an inlet port and/or an outlet port and a variable volume chamber in fluid communication with said port(s), wherein altering the volume of the variable volume chamber effects and/or restricts flow of a fluid sample to and/or from said port(s).

28 Claims, 3 Drawing Sheets

OTHER PUBLICATIONS

Burns, M.A. et al.: "Microfabricated Structures for Integrated DNA Analysis", Proceedings of the National Academy of Sciences of USA, vol. 93, May 1996, pp. 5556-5561, XP000953502.

Krishnan M. et al.: "Microfabricated reaction and separation systems", Current Opinion in Biotechnology; vol. 12, No. 1, Feb. 2001, pp. 92-98, XP002255746.

Woolley A.T. et al.: "Functional integration of PCR amplification and capillary alectrophoresis in a microfabricated DNA analysis device", Analytical Chemistry, vol. 68, No. 23, Dec. 1, 1996, pp. 4081-4086, XP000642027.

Anderson R.C. et al.: "A miniature integrated device for automated multistep genetic assays", Nucleic Acids Research, England, Jun. 15, 2000, vol. 28, No. 12, pp. E60, XP002255747.

Compton J.: "Nucleic acid sequence-based amplification", Nature, vol. 350, No. 6313, Mar. 7, 1991, pp. 91-92, XP000176319.

Leone et al.: "Molecular beacon probes combined with amplification by NASBA enable homogeneous, real-time detection of RNA", Nucleic Acids Research, Oxford University Press, Surrey, GB, vol. 26, No. 9, 1998, pp. 2150-2155, XP002134179.

* cited by examiner

FLUID MANIPULATION IN A MICROFABRICATED REACTION CHAMBER SYSTEMS

The present invention relates to a microfabricated reaction chamber system and a method of fluid transport. The system may be used, for example, in a method of carrying out a nucleic acid sequence amplification and detection process on a nucleic acid sample.

By the term microfabricated device or system as used herein is meant any device manufactured using processes that are typically, but not exclusively, used for batch production of semiconductor microelectronic devices, and in recent years, for the production of semiconductor micromechanical devices. Such microfabrication technologies include, for example, epitaxial growth (eg vapour phase, liquid phase, molecular beam, metal organic chemical vapour deposition), lithography (eg photo-, electron beam-, x-ray, ion beam-), etching (eg chemical, gas phase, plasma), electrodeposition, sputtering, diffusion doping and ion implantation. Although non-crystalline materials such as glass may be used, microfabricated devices are typically formed on crystalline semiconductor substrates such as silicon or gallium arsenide, with the advantage that electronic circuitry may be integrated into the system by the use of conventional integrated circuit fabrication techniques. Combinations of a microfabricated component with one or more other elements such as a glass plate or a complementary microfabricated element are frequently used and intended to fall within the scope of the term microfabricated used herein. Also intended to fall within the scope of the term microfabricated are polymeric replicas made from, for example, a crystalline semiconductor substrate.

The isolation and purification of DNA and/or RNA from bacterial cells and virus particles is a key step in many areas of technology such as, for example, diagnostics, environmental monitoring, forensics and molecular biology research.

Microfabrication is an attractive construction method for producing devices for carrying out biological processes for which very small sample volumes are desirable, such as DNA sequence analysis and detection.

One such device, for carrying out a polymerase chain reaction (PCR) followed by a detection step is disclosed in U.S. Pat. No. 5,674,742. Lamb wave pumps are used to transport DNA primers, polymerase reagents and nucleotide reagents from three separate storage chambers into a single reaction chamber as and when required to carry out a PCR process, with the temperature of the reaction chamber being cycled as required.

Another microfabricated device, for carrying out a chemical reaction step followed by an electrophoresis separation step, is disclosed in Analytical Chemistry 1994, 66, 4127-4132. Etched structures in a silicon substrate covered by a glass plate provide a reaction chamber and connections to buffer, analyte, reagent and analyte waste reservoirs, as well as an electrophoresis column connected to a waste reservoir.

Nucleic acid sequence-based amplification (NASBA) is a primer-dependent technology that can be used for the continuous amplification of nucleic acids in a single mixture at one temperature (isothermal nucleic acid amplification method) and was one of the first RNA transcription-based amplification methods described. NASBA normally offers a simple and rapid alternative to PCR for nucleic acid amplification, and is capable of yielding an RNA amplification of a billion fold in 90 minutes. With respect to other amplification systems such as the PCR technique, the ability of NASBA to homogeneously and isothermally amplify RNA analytes extends its application range from viral diagnostics to the indication of biological activities such as gene expression and cell viability. NASBA technology is discussed, for example, in Nature volume 350 pages 91 and 92.

Nucleic acid amplification in NASBA is accomplished by the concerted enzyme activities of AMV reverse transcriptase, Rnase H, and T7 RNA polymerase, together with a primer pair, resulting in the accumulation of mainly single-stranded RNA that can readily be used for detection by hybridization methods. The application of an internal RNA standard to NASBA results in a quantitative nucleic acid detection method with a dynamic range of four logs but which needed six amplification reactions per quantification. This method is improved dramatically by the application of multiple, distinguishable, internal RNA standards added in different amounts and by electrochemiluminesence (ECL) detection technology. This one-tube quantitative (Q) NASBA needs only one step of the amplification process per quantification and enables the addition of the internal standards to the clinical sample in a lysis buffer prior to the actual isolation of the nucleic acid. This approach has the advantage that the nucleic acid isolation efficiency has no influence on the outcome of the quantitation, which in contrast to methods in which the internal standards are mixed with the wild-type nucleic acid after its isolation from the clinical sample. Quantitative NASBA is discussed in Nucleic Acid Research (1998) volume 26, pages 2150-2155.

Post-NASBA product detection, however, can still be a labour-intensive procedure, normally involving enzymatic bead-based detection and electrochemiluminescent (ECL) detection or fluorescent correlation spectrophotometry. However, as these methodologies are heterogeneous or they require some handling of sample or robotic devices that are currently not cost-effective they are relatively little used for high-throughput applications. A homogeneous procedure in which product detection is concurrent with target amplification by the generation of a target-specific signal would facilitate large-scale screening and full automation. Recently, a novel nucleic acid detection technology, based on probes (molecular beacons) that fluoresce only upon hybridization with their target, has been introduced.

Molecular beacons are single-stranded oligonuclotides having a stem-loop structure. The loop portion contains a sequence complementary to the target nucleic acid, whereas the stem is unrelated to the target and has a double-stranded structure. One arm of the stem is labelled with a fluorescent dye, and the other arm is labelled with a non-fluorescent quencher. In an isolated state the probe does not produce fluorescence because absorbed energy is transferred to the quencher and released as heat. When the molecular beacon hybridizes to its target it undergoes a conformational change that separates the fluorophore and the quencher, and the bound probe fluoresces brightly. Molecular beacon probes are discussed, for example, in U.S. Pat. No. 6,037,130 and in Nucleic Acids Research, 1998, vol. 26, no. 9.

Even the one tube quantitative Q-NASBA process generally requires at least two steps, typically a first primer annealing step carried out at about 65 degrees Celsius followed by an amplification and detection step carried out at about 41 degrees Celsius. The enzymes required for the second step would be denatured by the elevated temperature required for the first step, so must be added once the temperature of the process components has fallen sufficiently. Furthermore, as for most nucleic acid sequence amplification and detection processes, NASBA requires reagents specific to the target nucleic acid sequence to be used. To carry out simultaneous analysis of a DNA/RNA sample for a number of different target nucleic acid sequences generally requires the handling of a large number of different reagent sets, each requiring separate handling and use in separate test tubes.

Fluidics is the science of liquid flow in, for example, tubes. For microfabricated devices, flow of a fluid through the one or more sets of micro or nano sized reaction chambers is typically achieved using a pump such as a syringe, rotary pump or precharged vacuum or pressure source external to the device. Alternatively, a micro pump or vacuum chamber, or lamb wave pumping elements may be provided as part of the device itself. Other combinations of flow control elements including pumps, valves and precharged vacuum and pressure chambers may be used to control the flow of fluids through the reaction chambers. Other mechanisms for transporting fluids within the system include electro-osmotic flow. The accurate manipulation of nanolitre volumes of a fluid sample using such techniques can be problematic and complicated.

The present invention seeks to address at least some of the problems of the prior art.

Accordingly, the present invention provides, in a first aspect, a microfabricated chamber system comprising an inlet port and/or an outlet port and a variable volume chamber in fluid communication with said port(s), wherein altering the volume of the variable volume chamber effects and/or restricts flow of a fluid sample to and/or from said port(s).

Altering the volume of the variable volume chamber creates a pressure difference at said port(s), thereby effecting and/or restricting flow of a fluid sample to and/or from said port(s).

The microfabricated chamber system will typically be a microfabricated reaction chamber system. The variable volume chamber may also act as a reaction chamber, i.e. a chamber in which a reaction occurs.

The variable volume chamber is preferably microfabricated and integral to a microfabricated system.

The microfabricated reaction chamber system may comprise a substrate optionally coated as described hereinafter and an overlying flexible membrane, the variable volume chamber being defined by a recess in a surface of the substrate and the adjacent surface of the flexible membrane.

The microfabricated reaction chamber system may include one or more reaction chambers, one or more channels or conduits, and one or more variable volume chambers. Any or all of these may be defined by one or more recesses in the substrate, said recess(es) optionally being coated with a coating material.

In a second aspect of the present invention, there is provided a microfabricated reaction chamber system comprising a reaction chamber and a variable volume chamber in communication with the reaction chamber, wherein altering the volume of the variable volume chamber effects and/or restricts flow of a fluid sample into and/or out of the reaction chamber.

The reaction chamber will typically have at least an inlet port. The variable volume chamber will typically have at least an outlet port. Again, altering the volume of the variable volume chamber creates a pressure difference between the inlet port and the outlet port, thereby effecting and/or restricting flow of a fluid sample into and/or out of the reaction chamber.

The reaction chamber and/or the variable volume chamber may be optionally coated as described hereinafter.

The reaction chamber and the variable volume chamber are preferably integrally formed in a device by any suitable microfabrication technique.

The variable volume chamber advantageously comprises a chamber having at least one wall formed from a flexible material, wherein lowering and/or raising a portion of the said at least one wall alters the volume of the variable volume chamber. The wall is formed from a flexible material which is preferably resiliently biased so that in its unstressed state it returns to its original form. Examples of suitable flexible material include polymeric materials such as, for example, COC (Cyclo olefin copolymer), polyethylene, polypropylene, PL (Polylactide), PBT (Polybutylene terephthalate) and PSU (Polysulfone), including blends of two or more thereof. The flexible material is preferably in the form of a thin membrane (typically 100 to 300 µm thick, more typically 130 to 250 µm, still more typically approximately 200 µm) and is also preferably optically transparent or translucent. The flexible material may be formed by, for example, injection moulding.

The substrate base typically has a thickness of 0.5 to 3 mm, more typically 1 to 2 mm. The substrate is also preferably formed from a polymeric material, which may be same material as that forming the membrane.

As noted above, the substrate base may be provided with a coating of thickness typically up to 1 µm, preferably less than 0.5 µm. The coating is preferably formed from one or more of the group comprising polyethylene glycol (PEG), Bovine Serum Albumin (BSA), tweens and dextrans.

Preferred dextrans are those having a molecular weight of 9,000 to 200,000, especially preferably 20,000 to 100,000, particularly 25,000 to 75,000, for example 35,000 to 65,000.

Tweens (or polyoxyethylene sorbitans) may be any of these available, for example, from the Sigma Aldrich Company.

PEGs are preferred as the coating means, either singly or in combination with other PEGs or other coatings. By PEG is embraced pure polyethylene glycol, i.e. of the formula HO—$(CH_2CH_2O)_n$—H, where n is an integer to afford a PEG having, for example, a molecular weight of from 200-10,000, especially 1,000 to 5,000; or chemically modified PEG in which one or more ethylene glycol oligomers are connected by way of homobifunctional group(s), such as, for example, phosphate linkers or aromatic spacers. Particularly preferred is a polyethylene glycol known as FK108 in which a polyethylene glycol chain is connected to another through a phosphate. Also, the PEG sold by the Sigma Aldrich Company as product P2263 may be used.

Attachment or use of the above coatings has been found to result in surfaces of chamber, channels, conduits, etc to which the substrates/samples under analysis in the system do not adhere, thus permitting improved fluid flow through the system. PEG coatings adhere particularly well to the substrate. Surfaces coated with PEG also helps prevent adsorption of target and enzymes.

The reaction chamber/device may be filled by capillary forces and hence the hydrophilicity of the internal surfaces may be tailored accordingly. Both tween and dextran gives highly hydrophilic surfaces but can hinder an optimal bonding of the membrane (eg COC). PEG and BSA do not affect the bonding of the membrane to a significant degree.

By lowering at least a portion of the flexible wall in a direction towards the substrate (this may be achieved by, for example, depression of the wall), the volume of the variable volume chamber is reduced with the corollary of an increase in pressure in a substantially sealed system. The increase in pressure results in a flow of a fluid or fluid sample away from the variable volume chamber and towards the reaction chamber. Similarly, by raising at least a portion of the flexible wall in a direction away from the substrate (this may be achieved by, for example, pulling the flexible wall or simply allowing the flexible wall to revert to its original (unstressed) state), the volume of the variable volume chamber is increased with the corollary of an decrease in pressure in a substantially sealed system. The decrease in pressure results in a flow of a fluid or fluid sample away from the reaction chamber and towards the variable volume chamber.

As will be appreciated, the volume of the variable volume chamber may be adjusted to a number of levels to provide a range of pressure conditions within the system. This enables a fluid sample to be transported/manipulated in the microfabricated device. For example, a particular decrease in the volume of the variable volume chamber may be sufficient to effect flow of a fluid sample to the reaction chamber.

A further decrease in the volume of the variable volume chamber may be sufficient to effect flow of the fluid sample from the reaction chamber, perhaps to another reaction chamber or to an outlet, for example.

Alternatively, or in combination, two or more variable volume chambers may be provided and may be actuated concurrently or sequentially to result in a range of pressure conditions within the system. For example, if the system comprises two or more reaction chambers, then the provision of two or more variable volume chambers makes it possible to achieve flow of a fluid sample to the first reaction chamber (by actuating the first variable volume chamber) and flow from the first reaction chamber to the second reaction chamber (by actuating the second variable volume chamber, optionally in conjunction with the first variable volume chamber).

The reaction chamber and the variable volume chamber may be formed in a common substrate material or, alternatively, in different substrate materials. A common substrate is, however, preferred.

The microfabricated reaction chamber system as herein described preferably comprises an optionally coated substrate and an overlying flexible membrane, the variable volume chamber being defined by a recess in a surface of the substrate and the adjacent surface of the flexible membrane. Accordingly, the variable volume chamber may be defined by a base and a substantially vertically upstanding side wall or walls formed in the underlying substrate and a flexible top wall bonded to the top portion of said side wall or walls. Similarly, the reaction chamber is also preferably defined by a recess in a surface of the substrate and the adjacent surface of the flexible membrane. A channel may be provided between the reaction chamber and variable volume chamber. The channel is also preferably defined by a recess in a surface of the substrate and the adjacent surface of the flexible membrane. As will be appreciated, there is no requirement as such for either the reaction chamber or channel to be bounded by a flexible top wall. However, using a common flexible top wall simplifies manufacture.

The term recess as used herein is also intended to cover a variety of features including, for example, grooves, slots, holes, trenches and channels, including portions thereof.

The term flexible membrane as used herein is intended to cover any flexible or pliable material. The purpose of the flexible membrane is to alter the volume of the variable volume chamber. The membrane will typically be substantially impermeable to a liquid sample or reagent introduced into the chamber. The membrane will also typically be substantially impermeable to air.

The variable volume chamber may have any shape, but will generally have a circular or generally circular side wall. Typically, the variable volume chamber has a diameter of 0.5 to 1.5 mm, more typically approximately 1 mm, and a depth of typically 20 to 80 µm (preferably 30 to 70 µm, more preferably approximately 50 µm).

The reaction chamber may, itself, be provided in a portion of a channel defined by a recess in a surface of the substrate and the adjacent surface of the flexible membrane. In a preferred embodiment, two or more reaction chambers are provided in portions of a channel defined by a recess in a surface of the substrate and the adjacent surface of the flexible membrane. At least one of the chambers is in fluid communication with the variable volume chamber. The typical dimensions of such a channel are 100 to 300 µm width (preferably 150 to 250 µm, more preferably approximately 200 µm) and 20 to 80 µm depth (preferably 30 to 70 µm, more preferably approximately 50 µm).

It will be appreciated that the microfabricated reaction chamber system as herein described may include two or more reaction chambers and two or more variable volume chambers. Fluid communication is provided between at least one reaction chamber and at least one variable volume chamber.

The reaction chamber or chambers may be pre-loaded with reagent(s) during manufacture of the system.

The microfabricated reaction chamber system preferably further includes means for altering the volume of the variable volume chamber. Such means may comprise at least one depression member which is adapted to be brought into contact with at least a portion of the flexible membrane to cause depression thereof into the underlying recess, thereby reducing the volume of the variable volume chamber, Alternatively, or in combination, such means for altering the volume of the variable volume chamber may comprise at least one extension member which is adapted to be brought into contact with at least a portion of the flexible membrane to extend the membrane out and away from the underlying recess, thereby increasing the volume of the variable volume chamber. Generally, however, all that is required is to raise the at least one depression member so as to allow the flexible membrane to revert to its original (unstressed) state. The members may be in the form of pins, with rounded or blunt ends so as not to puncture the flexible membrane.

In either case, the at least one depression member may be an axially displaceable member provided in an actuator. An array of depression members (each of which may be axially displaceable) may be provided in an arrangement substantially in register with the positions of a corresponding array of variable volume chambers.

Alternatively, one or more arrays or rows of fixed members may be provided in an arrangement substantially in register with the positions of a corresponding array of variable volume chambers. If the members are attached directly or indirectly to a common actuator, then they may all be actuated at the same time. Again, the members may be in the form of pins, with rounded or blunt ends so as not to puncture the flexible membrane.

In an alternative embodiment, the means for altering the volume of the variable volume chamber is achieved using fluid pressure, for example air pressure. In this manner, depression of the membrane into the underlying recess may be achieved by increasing the pressure above the membrane. This may be effected using a supply of air which can be introduced into a substantially sealed region above the membrane. Similarly, raising the membrane out from the underlying recess may be achieved by decreasing the pressure above the membrane. It will be appreciated that the substantially sealed region acts like a balloon, the wall of the balloon facing and adjacent to the recess acting to increase or decrease the volume of the variable volume chamber, depending on the pressure in the sealed region.

The microfabricated reaction chamber system may be used for carrying out a process on a biological fluid, a dairy product, an environmental fluids and/or drinking water.

The microfabricated reaction chamber system may be used for carrying out any suitable biological or chemical reaction such as, for example, enzyme reactions, immuno reactions, sequencing, hybridisation.

In a preferred embodiment, there is provided a microfabricated reaction chamber system as herein described for carrying out a nucleic acid sequence amplification and detection process on a nucleic acid sample, the process comprising at least first and second process steps using first and second reagents, the system comprising:
- an inlet port;
- a first reaction chamber in communication with the inlet port, for carrying out the first process step;
- a second reaction chamber in communication with the first reaction chamber, for carrying out the second process step;
- an outlet port in communication with the second reaction chamber; and
- at least one variable volume chamber in communication with the first and/or the second reaction chambers, wherein altering the volume of the at least one variable volume chamber effects and/or restricts flow of a fluid sample into and/or out of the first and/or second reaction chambers.

The variable volume chamber is preferably as herein described with reference to either the first or second aspects.

A single fluid path, whereby the sample is passed into the first reaction chamber for carrying out the first process step, then into the second reaction chamber for the second process step, simplifies construction and operation of the device.

By providing two separate reaction chambers, separate reagents for separate process steps may be conveniently preloaded into the system before use, and no active components are then required to move reagents within the device during use. The reagents for second and any subsequent process steps may be protected from damaging environmental conditions such as elevated temperatures required during earlier process steps.

A sample loading chamber may be provided between the inlet port and the first reaction chamber, for example to facilitate controlled loading of a sample into the device or first reaction chamber.

The first reagent (which may be substantially dry) is preferably preloaded within the first reaction chamber. The second reagent (which may be substantially dry) is also preferably preloaded within the second reaction chamber. This may conveniently be carried out during manufacture of the system. To enhance storage qualities the reagent mixes may be lyophilised or dried in situ.

The nucleic acid sample may be derived from, for example, a biological fluid, a dairy product, an environmental fluids and/or drinking water. Examples include blood, serum, saliva, urine, milk, drinking water, marine water and pond water. For many complicated biological samples such as, for example, blood and milk, it will be appreciated that before one can isolate and purify DNA and/or RNA from bacterial cells and virus particles in a sample, it is first necessary to separate the virus particles and bacterial cells from the other particles in sample. It will also be appreciated that it may be necessary to perform additional sample preparation steps in order to concentrate the bacterial cells and virus particles, i.e. to reduce the volume of starting material, before proceeding to break down the bacterial cell wall or virus protein coating and isolate nucleic acids. This is important when the starting material consists of a large volume, for example an aqueous solution containing relatively few bacterial cells or virus particles. This type of starting material is commonly encountered in environmental testing applications such as the routine monitoring of bacterial contamination in drinking water.

The system is preferably designed to cater for a sample volume of $\leq 50$ nl, preferably $\leq 20$ nl, more preferably $\leq 10$ nl. Thus the volume of each of the reaction chambers will typically be $\leq 50$ nl, preferably $\leq 20$ nl, more preferably $\leq 10$ nl. However, and as will be appreciated, larger sized chambers may be used, for example chambers having a volume of 100 to 500 nl.

Preferably, one or more temperature controllers are provided to enable the first process step to be carried out at a first temperature, and to enable the second process step to be carried out at a second temperature that is lower than the first temperature. For example, separate first and second temperature controllers may be used to control the temperatures of the first and second process steps. Various nucleic acid amplification processes, such as NASBA processes, which require higher temperatures for an earlier process step, which would denature reagents used in a later process steps, may in this way be conveniently and easily carried out in a microfabricated reaction chamber system or device.

Preferably, means are provided for heating the contents of the first chamber to a temperature of from 60 to 70° C., more preferably from 63 to 67° C., still more preferably $\approx 65°$ C. Preferably, means are provided for heating the contents of the second chamber to a temperature of up to 41.5° C., more preferably $\approx 41°$ C.

Preferably, the first temperature controller comprises a first temperature sensor positioned adjacent to the first reaction chamber and the second temperature controller comprises a second temperature sensor positioned adjacent to the second reaction chamber.

Preferably, the first temperature controller comprises a first controllable electric heat source (for example an electrical resistor element) positioned adjacent to the first reaction chamber and the second temperature controller comprises a second controllable electric heat source (for example an electrical resistor element) positioned adjacent to the second reaction chamber.

The system may thus preferably include integrated electrical heaters and temperature control.

Peltier element(s) and/or thermocouple(s) may be used to maintain the sample at the desired temperature in the first and/or second chambers, preferably to within $\pm 0.5°$ C. In particular, thermocouples may be used to measure the temperature of the first and second chambers, wherein the thermocouples are linked by one or more feedback circuits to Peltier elements for heating the sample to the desired temperature in the first and second chambers.

A thermal barrier may advantageously be provided the substantially thermally isolate the second reaction chamber from the first reaction chamber. The thermal barrier may simply comprise a portion of a channel that spaces a first reaction chamber from a second reaction chamber. Different portions of the channel may define one or both of the reaction chambers.

The outlet port may be provided with a pressure control valve or flow control valve, to control the flow of the sample and/or other fluids through the system. This may be used in optionally conjunction with a pump, which may be provided at the inlet end of the system, to control the flow of fluids into and through the reaction chambers.

The system may be provided with an optical interface for excitation and/or detection purposes. Accordingly, if optical observations of the contents of the second reaction chamber are required, then at least one wall defining the second chamber comprises an optically transparent substance or material, for example a polymeric material or glass. Preferably, the system comprises at least one optical source arranged for exciting fluorescence in material contained within the second reaction chamber, and at least one optical detector, arranged to detect said fluorescence. For example, molecular beacon probes may be provided in the second reaction chamber to detect one or more target nucleic acid sequences. These probes fluoresce when in the presence of target nucleic acid sequences, thereby enabling detection and quantification of such sequences. The system thus provided amplification combined with optical-fluorescence detection. However, other detection methods could be used, for example, using impedance measurements. Preferably, the optical source is provided by one or more light emitting diodes, and the optical detector comprises at least one avalanche photodiode. However, other sources and detectors could also be used. For example the optical detector could comprise at least one photomultiplier tube. Preferably, a bandpass filter is provided to filter the light impinging on the detector, in particular to filter out light emitted by the optical source. A micro-lens may be provided to direct the fluorescence onto the detector or, alternatively, a confocal microscope could be used.

An integrated microfabricated reaction chamber system may be provided with a plurality of sets interconnected first and second reaction chambers as described above, each of which may have a separate outlet port. In this way a range of different analysis processes may be carried out simultaneously within a single micromachined device.

A single set of first and second reaction chambers, or multiple sets of first and second reaction chambers may be connected to a common inlet port. As will be appreciated, the system may comprise third, fourth, fifth, etc, reaction chambers.

The present invention also provides a method for the manufacture of a microfabricated chamber system, which method comprises:

(i) providing a substrate having at least one recess in a surface thereof and optionally adhering thereto a coating as hereinbefore described;

(ii) providing a flexible membrane; and (iii) bonding the flexible membrane to the substrate to create at least one variable volume chamber defined by said at least one recess in said surface of the substrate and the adjacent surface of the flexible membrane.

This method may be used for the manufacture of a microfabricated chamber system as herein described.

The substrate will typically be provided with at least a first recesses in a surface thereof and a second recesses in fluid communication with said first recess, wherein said variable volume chamber is defined by said first recess in said surface of the substrate and the adjacent surface of the flexible membrane.

The second recess may define at least one reaction chamber. The at least one reaction chamber may be defined by said second recess in said surface of the substrate and the adjacent surface of the flexible membrane. Alternatively, the at least one reaction chamber may be defined by said second recess in said surface of the substrate and an adjacent surface of a wall other than the flexible membrane.

The first and second recesses may be connected by a channel provided in the surface of the substrate.

Alternatively or in combination, the second recess may itself be in the form of a channel. In this case, two or more reaction chambers may be defined by adjacent portions of the channel.

As already stated, the term recess as used herein is also intended to cover a variety of features including, for example, grooves, slots, holes, trenches and channels.

The method preferably further comprises, prior to the step of bonding the flexible membrane to the substrate but after attachment of any substrate coating, if used, depositing one or more reagents in said second recess. In particular if the second recess is in the form of a channel, the method preferably comprises, prior to the step of bonding the flexible membrane to the substrate, depositing a first reagent in a first portion of said channel defining a first reaction chamber, and depositing a second reagent in a second portion of said channel defining a second reaction chamber. In this manner, a first reagent (which may be substantially dry) is preloaded within the first reaction chamber, and a second reagent (which may be substantially dry) is preloaded within the second reaction chamber. To enhance storage qualities the reagent mixes may be lyophilised or dried in situ.

The first and second reagents may comprise, for example, NASBA primers, ribonucleoside and deoxyribonucleoside triphosphates, enzymes for carrying out a NASBA reaction and molecular beacon probe oligonucleotide.

The system or at least a master version thereof will typically be formed from or comprise a semiconductor material, although dielectric (eg glass, fused silica, quartz, polymeric materials and ceramic materials) and/or metallic materials may also be used. Examples of semiconductor materials include one or more of: Group IV elements (i.e. silicon and germanium); Group III-V compounds (eg gallium arsenide, gallium phosphide, gallium antimonide, indium phosphide, indium arsenide, aluminium arsenide and aluminium antimonide); Group II-VI compounds (eg cadmium sulphide, cadmium selenide, zinc sulphide, zinc selenide); and Group IV-VI compounds (eg lead sulphide, lead selenide, lead telluride, tin telluride). Silicon and gallium arsenide are preferred semiconductor materials. The system may be fabricated using conventional processes associated traditionally with batch production of semiconductor microelectronic devices, and in recent years, the production of semiconductor micromechanical devices. Such microfabrication technologies include, for example, epitaxial growth (eg vapour phase, liquid phase, molecular beam, metal organic chemical vapour deposition), lithography (eg photo-, electron beam-, x-ray, ion beam-), etching (eg chemical, gas phase, plasma), electrodeposition, sputtering, diffusion doping, ion implantation and micromachining. Non-crystalline materials such as glass and polymeric materials may also be used. Where polymeric materials are used, fabrication may be effected using conventional processes for manipulating plastics/polymeric materials such as, for example, injection moulding.

Examples of polymeric materials include PMMA (Polymethyl methylacrylate), COC (Cyclo olefin copolymer), polyethylene, polypropylene, PL (Polylactide), PBT (Polybutylene terephthalate) and PSU (Polysulfone), including blends of two or more thereof.

Combinations of a microfabricated component with one or more other elements such as a glass plate or a complementary microfabricated element are frequently used and intended to fall within the scope of the term microfabricated used herein.

The one or more systems will typically be integrally formed. The systems may be microfabricated on a common substrate material, for example a semiconductor material as herein described, although a dielectric substrate material such as, for example, glass or a ceramic material could be used. The common substrate material is, however, preferably a plastic or polymeric material and suitable examples are given above. The system may preferably be formed by replication of, for example, a silicon master.

The microfabricated system may be designed to be disposable after it has been used once or for a limited number of times. This is an important feature because it reduces the risk of contamination.

The microfabricated system may be incorporated into an apparatus for the analysis of, for example, biological fluids, dairy products, environmental fluids and/or drinking water. Again, the apparatus may be designed to be disposable after it has been used once or for a limited number of times.

The microfabricated system/apparatus may be included in an assay kit for the analysis of, for example, biological fluids, dairy products, environmental fluids and/or drinking water, the kit further comprising means for contacting the sample with the device. Again, the assay kit may be designed to be disposable after it has been used once or for a limited number of times.

The microfabricated system as herein described is also intended to encompass nanofabricated devices.

In a preferred embodiment, the system is formed from a plastic or plastic-comprising substrate (although other of the above recited materials may be used), capped with a flexible membrane, which may also be made of a plastic or plastic-comprising material, each variable volume chamber being defined by a recess in a surface of the substrate and the adjacent surface of the overlying flexible membrane. A channel or channels is/are preferably provided between the variable volume chamber(s) and the reaction chamber(s). Alternatively or in combination, the reaction chamber(s) may itself be in the form of a channel and two or more reaction chambers may be defined by adjacent portions of the channel.

Preferably, and in particular if optical observations of the contents of the second reaction chamber are required, the overlying cover is made of an optically transparent substance or material. Accordingly, if the flexible membrane also overlies the second reaction chamber, then it is preferably optically transparent. Alternatively, glass or Pyrex may be used.

For a silicon or semiconductor master, it is possible to define by, for example, etching or micromachinimg, one or more of variable volume chambers, microfluidic channels, reaction chambers and fluid interconnects in the silicon substrate with accurate microscale dimensions. A plastic replica may then be made of the silicon master. In this manner, a plastic substrate with an etched or machined microstructure may be bonded by any suitable means (for example using an adhesive or by heating) to a flexible plastic membrane thereby forming the enclosed chambers and channels. If the flexible membrane is transparent, then this allows the reagents to be optically excited and detected through the membrane.

Trenches may be formed in the substrate in appropriate locations to help thermally isolate the first and second reaction chambers from each other and from other parts of the device.

If the system includes an optical source arranged for exciting fluorescence in material contained within the second reaction chamber, and an optical detector, arranged to detect said fluorescence, the surface in the second reaction chamber is preferably optically smooth. It has been found that the surface roughness of the wall(s) defining the second chamber on which light may be incident should be less than approximately $1/10$th of the wavelength of the light. Reactive-Ion-Etching (RIE) of said wall(s) of the second chamber has been found to achieve a good surface quality with a roughness of less than approximately 40 nm.

Different regions of a channel may define the an inlet port and the first reaction chamber. Similarly, different regions of a channel may define the second reaction chamber and the outlet port. Accordingly the system may comprises one or more variable volume chamber fluid linked in series to a channel which defines, in different regions thereof, one or both of the first and second reaction chambers. As will be appreciated, third, fourth, etc, reaction chambers may be defined in further regions of the channel. An series of such channels may be provided.

The present invention also provides an actuator for use in combination with a microfabricated reaction chamber system as herein described, the actuator comprising at least one axially displaceable member, which is adapted, in use, to be brought into contact with at least a portion of the flexible membrane of a microfabricated reaction chamber system as herein described to cause depression thereof into the underlying recess, thereby reducing the volume of the variable volume chamber. Alternatively, or in combination, the actuator may comprise at least one axially displaceable member, which is adapted, in use, to be brought into contact with at least a portion of the flexible membrane of a microfabricated reaction chamber system as herein described to cause extension thereof out of and away from underlying recess, thereby increasing the volume of the variable volume chamber.

The actuator may comprise an array of said axially displaceable members, said array being arranged to be substantially in register with a corresponding array of variable volume chambers provided in the microfabricated reaction chamber system.

Alternatively, the actuator may comprise an array of fixed depression members, said array again being arranged to be substantially in register with a corresponding array of variable volume chambers provided in the microfabricated reaction chamber system.

The present invention also provides a combination of a microfabricated reaction chamber system as herein described and an actuator as herein described.

The present invention also provides a combination of an apparatus as herein described and an actuator as herein described.

The present invention also provides a combination of an assay kit as herein described and an actuator as herein described.

The present invention also provides a method of manipulating a fluid sample in a microfabricated chamber system, the method comprising:

providing a microfabricated chamber system comprising at least one variable volume chamber as herein described;
providing a fluid sample; and
altering the volume of the at least one variable volume chamber to thereby effect and/or restricts the flow of said fluid sample to and/or from said chamber.

For cases where the system includes two or more reaction chambers, then the method may include the following steps: altering the volume of the at least one variable volume chamber to thereby effect flow of said fluid sample into a first reaction chamber; thereafter, altering the volume of the at least one variable volume chamber to thereby effect flow of said fluid sample from said first reaction chamber into said second reaction chamber. While such a method may be achieved using just one variable volume chamber, it is preferably achieved using at least two variable volume chambers which may be actuated in sequence or concurrently.

This method may be used in a method of carrying out a nucleic acid sequence amplification and detection process on a nucleic acid sample.

In any event, the present invention also provides a method of carrying out a nucleic acid sequence amplification and detection process on a nucleic acid sample in a microfabricated reaction chamber system, the process comprising at least a first process step using a first reagent and a second process step using a second reagent, the method comprising the steps of:

(i) providing a microfabricated reaction chamber system comprising a first reaction chamber, a second reaction chamber in fluid communication with the first reaction chamber, and at least one variable volume chamber in communication with the second reaction chamber;

(ii) providing a nucleic acid sample;

(iii) passing the sample into a first reaction chamber and mixing it with the first reagent;

(iv) retaining the sample in the first reaction chamber for a first interval to carry out the first process step;

(v) altering the volume of said at least one variable volume chamber so as to create a pressure difference in the system, whereby the sample passes from the first reaction chamber into a second reaction chamber to be mixed with the second reagent;

(vi) retaining the sample in the second reaction chamber for a second interval to carry out the second process step; and (vii) during the second interval, measuring a physical phenomenon indicative of the presence of the target nucleic acid sequence.

In this method, the microfabricated reaction chamber system is preferably as herein described.

It will be appreciated that the system will, at some stage at least, need to be substantially sealed in order to achieve a pressure difference.

Step (iii) may also involve altering the volume of said at least one variable volume chamber so as to create a pressure difference in the system, whereby the sample passes into the first reaction chamber to be mixed with the first reagent.

As will be appreciated, altering the volume of a single variable volume chamber in two or more stages may be sufficient to achieve fluid flow in steps (iii) and (v). Alternatively, or in combination, two or more variable volume chambers may be provided, which may be actuated in sequence or concurrently.

The first reagent may be preloaded in the first reaction chamber, and the second reagent may be preloaded in the second reaction chamber.

The first and second reagents may preferably comprise suitable reagents for carrying out a NASBA reaction and molecular beacon probe oligonucleotide. The first reagent will typically comprise NASBA buffer and/or primer mix. The second reagent will typically comprise suitable enzyme(s).

Preferably, the method further comprises the steps of maintaining the contents of the first reaction chamber at a first temperature during the first interval and maintaining the contents of the second reaction chamber at a second temperature during the second interval, wherein the first temperature is higher than the second temperature, and is sufficiently high to denature the second reagent. The first temperature is typically from 60 to 70° C., preferably from 63 to 67° C., more preferably ≈65° C. The second temperature is typically 35 to 45° C., preferably ≦≈41.5° C., more preferably ≈41° C.

Preferably, the step of measuring comprises the steps of irradiating the second chamber to excite fluorescence and detecting any such fluorescence, for example in molecular beacon probes present in the second chamber which are adapted to fluoresce on annealing with a target nucleic acid sequence.

The present invention also provides a microfabricated reaction chamber system for carrying out a nucleic acid sequence amplification and detection process on a nucleic acid sample in a single reaction chamber comprising a variable volume chamber as herein described, the device comprising:

a reaction chamber having an inlet port and an outlet port and at least one wall that comprises an optically transparent material;

means for heating a sample contained in the reaction chamber to a temperature of ≦41.5° C. (preferably from 40.5 to 41.5° C.);

at least one optical source arranged adjacent said at least one wall for exciting fluorescence in a sample contained in the reaction chamber;

at least one optical detector, arranged to detect said fluorescence through said at least one wall; and at least one variable volume chamber in communication with the reaction chamber for creating a pressure difference at the inlet port and/or the outlet port to effect and/or restrict flow of a fluid sample to and/or from said port(s).

Such a device dispenses with the first chamber and may be used in circumstances where the target does not require a pre-denaturing step. Real-time amplification and detection takes place in a single microfabricated reaction chamber. The features (for example materials and construction) described herein in relation to the two chamber system are also pertinent and relevant to the single chamber system.

The present invention also provides a method of carrying out a nucleic acid sequence amplification and detection process on a nucleic acid sample in a system or device as herein described which comprises a single reaction chamber and a variable volume chamber, the method comprising:

assembling a reaction mixture in the single chamber, said mixture comprising the nucleic acid sample, NASBA primers, enzymes for carrying out a NASBA reaction, ribonucleoside and deoxyribonucleoside triphosphates, and molecular beacon probe oligonucleotide, wherein one or more of the constituents in the reaction mixture is/are introduced into the single chamber by altering the volume of the variable volume chamber;

heating said mixture contained in said reaction chamber to a temperature of ≦41.5° C. (preferably from 40.5 to 41.5° C.);

exciting fluorescence in said mixture contained in said reaction chamber by means of said at least one optical source; and detecting fluorescence in said mixture through said at least one wall by means of said at least one optical detector.

The present invention also provides a device which includes a microfabricated reaction chamber system as herein described, together and preferably in fluid communication with one or more of:

(A) means for filtering a sample prior to carrying out the method according to the present invention, for example to substantially remove particles contained in the sample which are larger in size that bacteria particles; and/or (B) means for separating virus particles and/or bacterial cells from the other particles in a sample prior to carrying out the method according to the present invention; and/or (C) means for concentrating bacterial cells and/or virus particles, i.e. to reduce the volume of starting material, prior to carrying out the method according to the present invention; and/or (D) means for breaking down the bacterial cell wall or virus protein coating and isolate nucleic acids prior to carrying out the method according to the present invention.

The methods as herein described are particularly advantageous when the process is a NASBA or quantitative NASBA process. The first and second reagents may comprise NASBA primers, ribonucleoside and deoxyribonucleoside triphosphates, enzymes for carrying out a NASBA reaction and molecular beacon probe oligonucleotide.

It will be appreciated that one or more of the NASBA primers, enzymes for carrying out a NASBA reaction, ribonucleoside and deoxyribonucleoside triphosphates, and molecular beacon probe oligonucleotide may be pre-loaded in the single chamber. Alternatively, or in combination with partial pre-loading, one or more of the aforementioned reactants may be mixed with the sample prior to passing it to the chamber.

A preferred embodiment of the present invention will now be described, by way of example, with reference to the accompanying drawings, of which.

Figure 1:
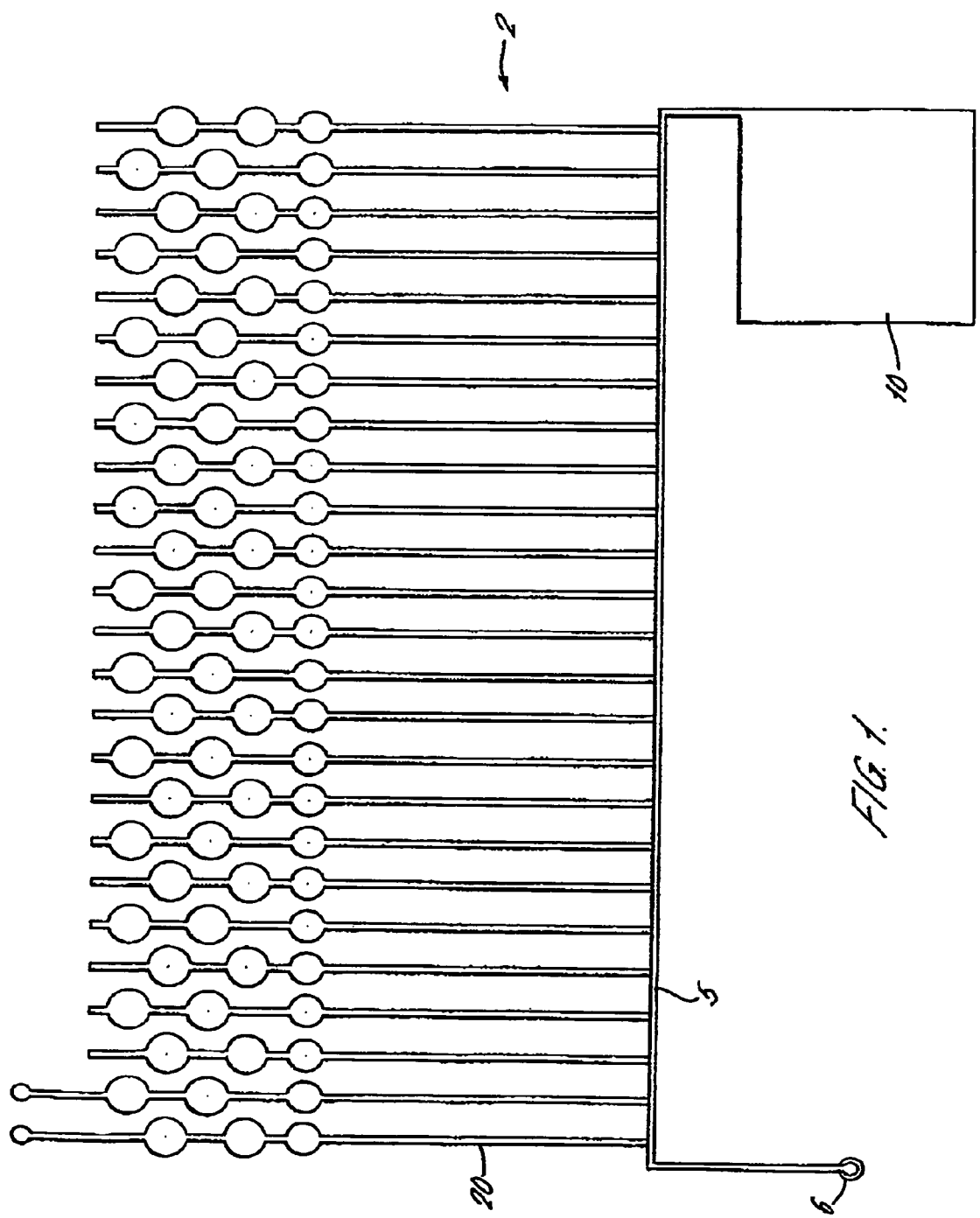
FIG. 1 is a plan view of a microfabricated reaction chamber device which includes a plurality of variable volume chambers according to a preferred embodiment of the present invention, for carrying out a nucleic acid sequence amplification and detection process.
Figure 2:
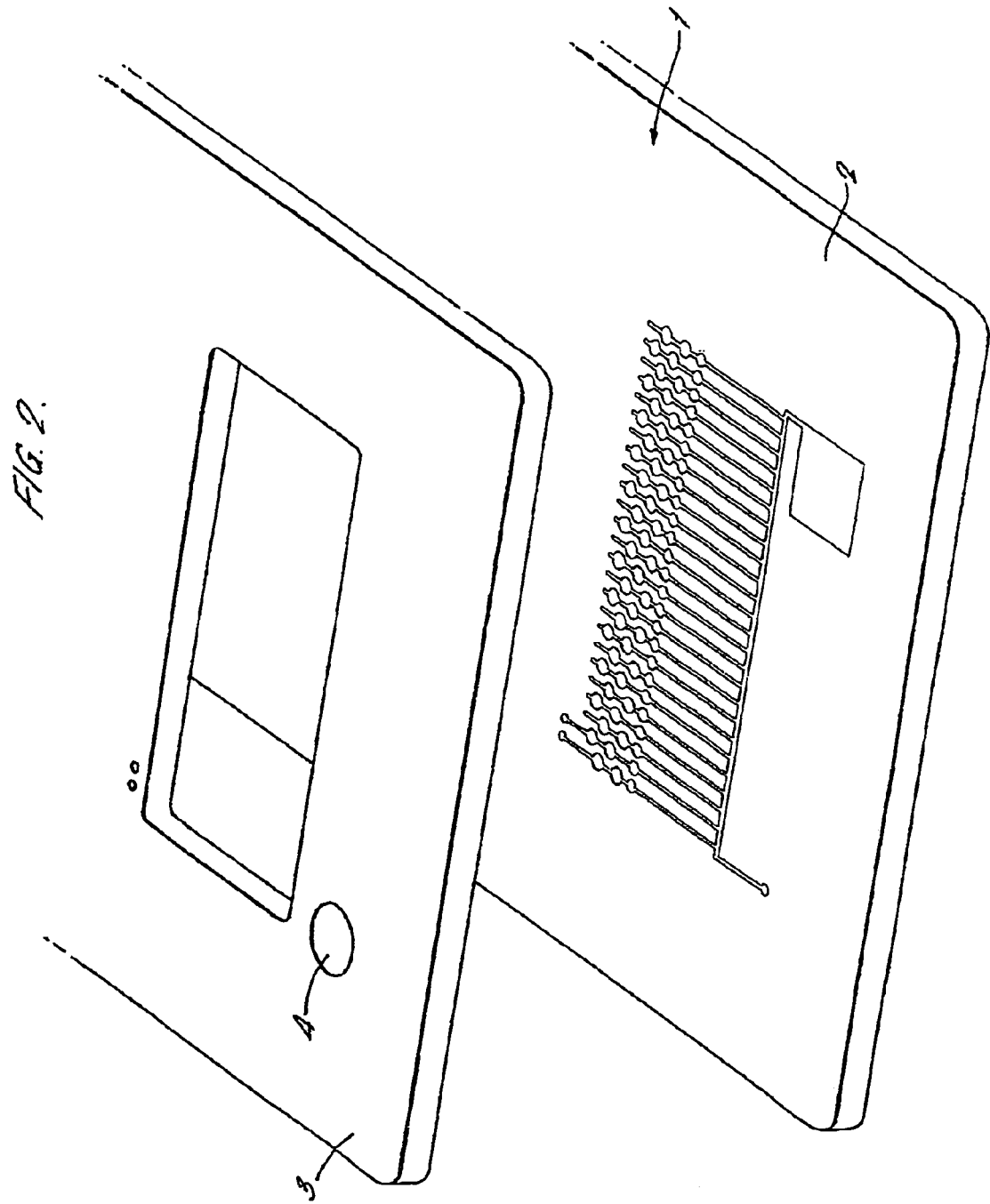
FIG. 2 is an exploded perspective view of the device shown in FIG. 1.

With reference to FIGS. 1 and 2, the microfabricated device 1 is in the form of a chip and comprises a plastic substrate 2 with the desired microstructure formed in its upper surface. The plastic substrate 2 is formed by replication of a silicon master. The substrate 2 is bonded at its upper surface to a flexible plastic membrane, thereby defining a series of chambers and channels. The flexible membrane is transparent and this allows reagents to be optically excited and detected through the membrane. In FIGS. 1 and 2, the plastic membrane overlies the substrate 2 and the series of enclosed chambers and channels can be seen.

The flexible membrane has a thickness of approximately 200 μm. The substrate 2 base has a thickness of 1 to 2 mm.

The device 1 may advantageously be used in a NASBA or quantitative. NASBA process.

The following is a description of the microstructure on the substrate 2. A supply channel 5 is connected at one end 6 to the sampling area 4 of a cover 3 for the chip 1 and at the other end 7 to a waste chamber 10. The waste chamber 10 is connected to the vent of the cover 3. Thus the supply channel 5 has connection to the atmosphere at both ends.

Figure 3:
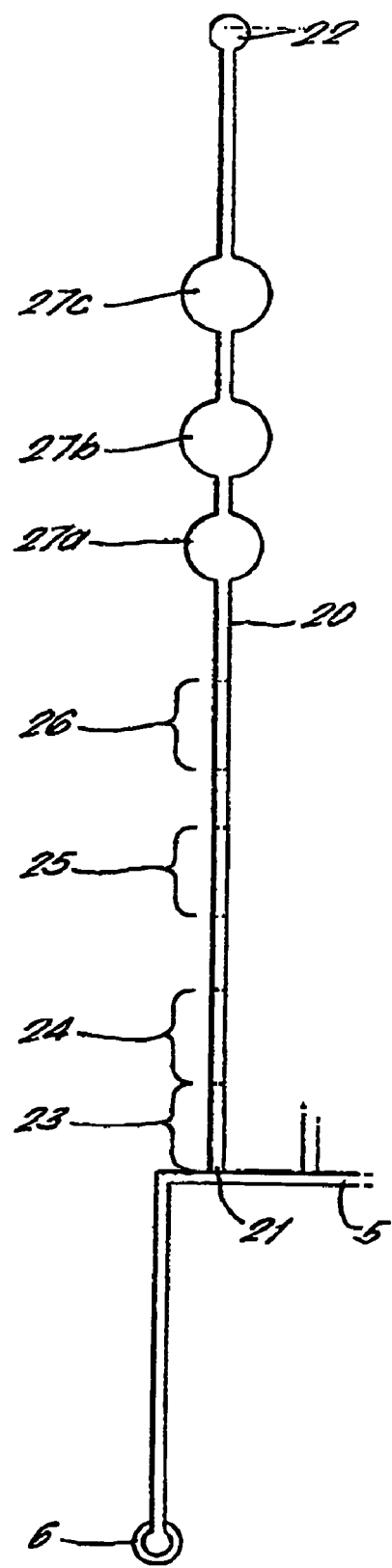
FIG. 3 is an enlarged view of a single reaction channel in the device shown in FIG. 1.

A plurality of reaction channels 20 branch perpendicularly in parallel from the supply channel 5. One such reaction channel 20 is shown in FIG. 3. Each reaction channel 20 is connected to the supply channel 5 at one end 21, while the other end 22 is closed off.

Each reaction channel 20 comprises a first reaction zone (or chamber) 24 and a second reaction zone (or chamber) 26. The portion of the channel between the first 24 and second 26 reaction zones defines a thermal barrier zone 25 to help thermally isolate the first 24 and second 26 reaction chambers from each other and from other parts of the device.

The initial portion of the channel adjacent the supply channel 5 defines a metering zone 23, to ensure that the same volume of sample is introduced into the reaction zones.

Each reaction channel 20 has a width of approximately 200 μm and a depth of approximately 50 μm. The metering zone 23 extends for approximately 1 mm, the first reaction zone 24 extends for approximately 1.5 mm, the thermal barrier zone 25 extends for approximately 2.5 mm, and the second reaction zone 26 extends for approximately 1.5 mm.

A first reagent is pre-loaded in the first reaction zone 24, and a second reagent is pre-loaded in the second reaction zone 26. The pre-loading steps are carried out during manufacture of the device 1. For example, approximately 10 nl of a first reagent may be deposited in the first reaction zone 24 prior to bonding the substrate 2 to the flexible plastic membrane. The first reagent may comprise, for example, about 0.5 nl of NASBA buffer and about 0.5 nl of primer mix solution. The NASBA buffer typically comprises the final concentration of approximately 20 micromolar molecular probes (specific towards the target RNA sequence), 100 nmol/nl of ROX (fluorescence control), 5 mM of each dNTP, 2 mM of ATP, UTP and CTP, 6.5 mM GTP, and 2.5 mM ITP, 2.5 mM dithiotreitol, 350 mM KCl, 60 mM $MgCl_2$, 200 mM Tris-HCl (pH=8.5). The primer mix solution typically comprises approximately 45% DMSO and 0.2 microM each of the antisense and sense primers.

Similarly, approximately 1 nl of a second reagent may be deposited in the second reaction zone 26 prior to bonding the substrate 2 to the flexible plastic membrane. The second reagent may comprise, for example, approximately 1875 mM sorbitol, 12.5 microgram BSA, 0.4 U RNase H, 160 U T7 RNA polymerase and 32 U AMV-reverse transcriptase.

The first and second reagents will generally be lyophilised.

In each reaction channel 20, three variable volume chambers 27a, 27b and 27c are provided in series and are located between the second reaction zone 26 and the sealed end 22. The distance of the variable volume chamber 27a from the second reaction zone 26 is approximately 0.5 mm. Each variable volume chamber 27a,b,c is defined by a base and a substantially vertically upstanding circular side wall in the substrate 2 and a flexible top wall/membrane bonded to the top portion of the circular side wall. Each variable volume chamber 27a,b,c has a diameter of approximately 1 mm, and a depth of approximately 50 μm. The volume of such a chamber is, accordingly, approximately 39 nl. Chambers 27a,b,c may, of course, have different dimensions. The variable volume chambers are in fluid communication with one another and with the second reaction zone 26, the thermal barrier zone 25, the first reaction zone 24, the metering zone 23 and the supply channel 5.

In the embodiment illustrated, the reaction channels 20 (and zones therein) are also defined by a recess in the surface of the substrate 2 and the adjacent surface of the flexible top wall/membrane. This simplifies manufacture. It will be appreciated, however, that the flexible top wall/membrane does not need to extend to the reaction channels. Instead, the channels 20 could be bound by a separate top wall since there is no requirement for the top wall bounding the channels 20 to be flexible.

The small structures at the very end of the reaction channels 20 contain a backup solution for one fluid actuation.

Heating means (not shown) are provided to independently heat the first 24 and second 26 reaction zones.

An actuator (not shown) comprises; a first set of pins provided, in use, in an arrangement substantially in register with the positions of the variable volume chambers 27a; a second set of pins provided, in use, in an arrangement substantially in register with the positions of the variable volume chambers 27b; and a third set of pins provided, in use, in an arrangement substantially in register with the positions of the variable volume chambers 27c. The first, second and third sets of pins may be lowered to contact and force the flexible membrane above the variable volume chambers 27a,b,c into the underlying recesses, thereby reducing the volume of the chambers 27a,b,c. The first, second and third rows of pins may be actuated concurrently, sequentially or completely independently of each other. When the first, second and third rows of pins are raised, the flexible membrane above the variable volume chambers 27a,b,c relaxes and the volume of the chambers 27a,b,c increases and eventually reverts to the original unstressed state.

The following steps may be performed when using the microfabricated reaction chamber device to carry out a nucleic acid sequence amplification and detection process on a biological or environmental sample. The sample containing DNA/RNA may be prepared by, for example, culturing a cell sample, concentrating the cultured cell sample, carrying out a lysis step to liberate DNA and RNA from the cultured cells, and purifying the sample to selectively retain DNA/RNA fragments.

1. The chip lis first inserted into a holder and mechanically aligned with the actuator (not shown).
2. A thermal control is activated to cause heating means to heat the front portion of the chip 1 (including the first reaction zone 24 and up to the thermal barrier 25) to approximately 65° C. and the rear portion of the chip (including the second reaction zone 26) to approximately 39° C.
3. The first, second and third rows of pins are lowered to contact and depress the flexible membrane above the variable volume chambers 27a,b,c into the underlying recesses, thereby reducing the volume of all the chambers 27a,b,c.
4. The chip 1 is unsealed and any excess gas escapes.
5. The sample is then introduced into the supply channel 5 via the sampling area 4 of the cover 3. The sample fills the supply channel 5. (The sample does not pass into the reactions channels 20 at this stage since they are "filled" with air and there is no opening at ends 22.)
6. The first set of pins are raised (one pin per variable volume chamber 27a). As a consequence, the membrane above the chambers 27a relaxes and the volume of the chambers 27a increases. This results in a pressure difference and creates a suction force which causes approximately 10 nl of the sample to pass into the metering zones 23 of the reaction channels 20.
7. Next, the remaining sample in the supply channel 5 is drained into the waste chamber 10. At the end of this step, the supply channel 5 is therefore filled with air. The waste chamber 10 may be filled with a fibre material (filter membrane) or a chemical ("super-slurper") and this provides the driving force for extracting the excess sample from the supply channel 5. The draining process may be initiated by a small external pressure burst at the sampling area or a lower pressure at the vent.
8. The second set of pins are then raised (one pin per variable volume chamber 27b). As a consequence, the membrane above the chambers 27b relaxes and the volume of the chambers 27b increases. This results in a pressure difference and again creates a suction force which causes the sample in the metering zones 23 to pass to the first reaction zones 24, which are pre-loaded with the first reagent.
9. The first set of pins may be repeatedly lowered and raised in an oscillatory motion to facilitate thorough mixing of the sample with the first reagent. The sample and first reagent are held in the first reaction zones 24 at a temperature of approximately 65° C. for about 5 minutes.
10. The temperature is set to approximately 41° C. for the rear portion of the chip (which includes the second reaction zone 26).
11. The third set of pins are raised (one pin per variable volume chamber 27c). As a consequence, the membrane above the chambers 27c relaxes and the volume of the chambers 27c increases. This results in a pressure difference and again creates a suction force which causes the sample in the first reaction zones 24 to pass, via the thermal barrier zone 24, to the second reaction zones 26, which are pre-loaded with the second reagent.
12. The first set of pins may again be repeatedly lowered and raised in an oscillatory motion to facilitate thorough mixing of the sample with the second reagent. The temperature is set to approximately 41° C. for the whole chip. The sample and second reagent are held in the second reaction zones 26 at this temperature until a fluorescence signal has reached an optimum level (typically about 60 minutes).
13. Optical measurements are then performed. This may simply be achieved using two LEDs (not shown), which may be alternately switched on and off for a period of five seconds or more. The fluorescence detected by a suitable detector during each 5 second interval is recorded in order to establish the quantity of the target nucleic acid sequence present in the second reaction zone 26.
14. Following the necessary calculations, the chip 1 may be removed discarded.

A microfabricated reaction chamber device embodying the invention may form an integral part of a larger microfabricated analysis device constructed as a single unit and containing, for example, apparatus for carrying out various sample preparation steps, and containing the various reagents required to carry out the sample preparation steps. Such a microfabricated analysis device could contain some or all of the control and data analysis circuitry required for its operation.

The microfabricated reaction chamber device or larger microfabricated analysis device described above may be designed for installation within a larger analysis unit. Such an analysis unit would typically provide electrical connections to the various active components and sensors of the device, and could provide some or all of the required control and sensor circuitry. The analysis unit could also provide some or all of the optical system, and means for pumping the sample through the reaction chambers. The unit could also provide DNA/RNA sample preparation equipment, although, as mentioned above, some or all of the sample preparation may be carried out in an integral device of which the microfabricated reaction chamber device forms a part. Microfabricated reaction chamber devices embodying the invention may be thereby manufactured for only one use, being installed in an analysis unit when needed and disposed of after use. The larger multi-use analysis unit could conveniently contain sufficient data handling and display equipment to provide a useful hand held analysis device.

The present invention provides an elegant method of manipulating fluids in a microchip for biological analysis.

The invention claimed is:

1. A microfabricated chamber system for carrying out a nucleic acid sequence amplification and detection process on a nucleic acid sample, the system comprising an inlet port and/or an outlet port characterized in that the system further comprises an array of variable volume chamber in fluid communication with said port(s), wherein altering the volume of the variable volume chamber effects and/or restricts flow of a fluid sample to and/or from said port(s), and wherein a variable volume chamber comprises a chamber having at least one wall formed from a flexible material, wherein depression and/or extension of the said at least one wall alters the volume of the variable volume chamber, and wherein the system further comprises an actuator comprising an array of depression members, said array being arranged to be substantially in register with the array of variable volume chambers, wherein, in use, a depression member is brought into contact with said at least one wall to cause depression thereof.

2. A microfabricated chamber system as claimed in claim 1, wherein the variable volume chamber is also a reaction chamber.

3. A microfabricated chamber system as claimed in claim 1 comprising a substrate and an overlying flexible membrane, the variable volume chamber being defined by a recess in a surface of the substrate and the adjacent surface of the flexible membrane.

4. A microfabricated chamber system as claimed in claim 1 wherein the reaction chamber and the variable volume chamber are formed in a common substrate material.

5. A microfabricated chamber system as claimed in claim 1 comprising a substrate and an overlying flexible membrane, each of the reaction chamber and variable volume chamber being defined by a recess in a surface of the substrate and the adjacent surface of the flexible membrane.

6. A microfabricated chamber system as claimed in claim 5, wherein a channel is provided between the reaction chamber and the variable volume chamber, said channel being defined by a recess in a surface of the substrate and the adjacent surface of the flexible membrane.

7. A microfabricated chamber system as claimed in claim 5 wherein the reaction chamber is provided in a portion of a channel defined by a recess in a surface of the substrate and the adjacent surface of the flexible membrane.

8. A microfabricated chamber system as claimed in claim 7, comprising two or more reaction chambers provided in portions of a channel defined by a recess in a surface of the substrate and the adjacent surface of the flexible membrane.

9. A microfabricated chamber system as claimed in claim 1, wherein at least a portion of the chamber system which, in use, comes into contact with a sample is provided with a surface coating comprising one or more of polyethylene glycol (PEG), Bovine Serum Albumin (BSA), tweens and dextrans.

10. A microfabricated chamber system as claimed in claim 1, wherein said array of depression member is axially displaceable.

11. A microfabricated chamber system as claimed in claim 1 which is for carrying out a process on a biological fluid, a dairy product, an environmental fluids and/or drinking water.

12. A microfabricated reaction chamber system as claimed in claim 1 for carrying out a nucleic acid sequence amplification and detection process on a nucleic acid sample, the process comprising at least first and second process steps using first and second reagents, the system comprising:
   an inlet port;
   a first reaction chamber in communication with the inlet port, for carrying out the first process step;
   a second reaction chamber in communication with the first reaction chamber, for carrying out the second process step;
   an outlet port in communication with the second reaction chamber; and
   an array of variable volume chamber in communication with the first and/or the second reaction chambers, wherein altering the volume of the variable volume chamber effects and/or restricts flow of a fluid sample into and/or out of the first and/or second reaction chambers.

13. A microfabricated reaction chamber system as claimed in claim 12, wherein a sample loading chamber is provided between the inlet port and the first reaction chamber.

14. A microfabricated reaction chamber system as claimed in claim 12, wherein the first reaction chamber is pre-loaded with the first reagent, and/or the second reaction chamber is pre-loaded with the second reagent.

15. A microfabricated reaction chamber as claimed in claim 12, wherein a first temperature controller is provided to control the temperature of the first process step and a second temperature controller is provided to control the temperature of the second process step.

16. A microfabricated reaction chamber as claimed in claim 15, wherein the first temperature controller is arranged such that the first process step is carried out at a first temperature, and the second temperature controlled is arranged such that the second process step is carried out at a second temperature that is lower than the first temperature.

17. A microfabricated reaction chamber as claimed in claim 15, wherein the first temperature controller comprises a first temperature sensor positioned adjacent to the first reaction chamber and the second temperature controller comprises a second temperature sensor positioned adjacent to the second reaction chamber.

18. A microfabricated reaction chamber as claimed in claim 12, wherein the first temperature controller comprises a first controllable electric heat source positioned adjacent to the first reaction chamber and the second temperature controller comprises a second controllable electric heat source positioned adjacent to the second reaction chamber.

19. A microfabricated reaction chamber as claimed in claim 12, wherein the outlet port is provided with a pressure control valve or a flow control valve.

20. A microfabricated reaction chamber as claimed in claim 12, further comprising at least one optical source arranged for exciting fluorescence in material contained within the second reaction chamber, and at least one optical detector, arranged to detect said fluorescence.

21. An integrally microfabricated reaction chamber system comprising a plurality of sets of interconnected first and second reaction chambers as defined in claim 1, characterized in that the system further comprises an array of variable volume chambers in fluid communication with the first and/or second reaction chambers, wherein altering the volume of a variable volume chamber effects and/or restricts flow of a fluid sample to and/or from the first and/or second reaction chambers, and wherein a variable volume chamber comprises a chamber having at least one wall formed from a flexible material, wherein depression and/or extension of the said at least one wall alters the volume of the variable volume chamber, and wherein the system further comprises an actuator comprising an array of depression members, said array being arranged to be substantially in register with the array of variable volume chambers, wherein, in use, a depression member is brought into contact with said at least one wall to cause depression thereof.

22. An integrally microfabricated reaction chamber system as claimed in claim 21, wherein each of the plurality of sets of interconnected first and second reaction chambers is provided with a separate outlet port.

23. An integrally microfabricated reaction chamber system as claimed in claim 21, wherein the plurality of first reaction chambers are in communication with a common inlet port.

24. An apparatus for the analysis of biological and/or environmental samples, the apparatus comprising a system as defined in claim 1.

25. An assay kit for the analysis of biological and/or environmental samples, the kit comprising a system as defined in claim 1 and means for contacting the sample with the device.

26. An apparatus as claimed in claim 24 which is disposable.

27. An actuator for use in combination with a microfabricated chamber system as defined in claim 3, the actuator comprising at least one depression member which is adapted, in use, to be brought into contact with at least a portion of the flexible membrane to cause depression thereof into the underlying recess, thereby reducing the volume of the variable volume chamber, said at least one depression member being preferably axially displaceable.

28. A microfabricated reaction chamber system for carrying out a nucleic acid sequence amplification and detection process on a nucleic acid sample in a single reaction chamber, the device comprising:

a reaction chamber having an inlet port and an outlet port and at least one wall that comprises an optically transparent material;

means for heating a sample contained in the reaction chamber to a temperature of $\leqq 41.5°$ C. (preferably from 40.5 to 41.5° C.); and at least one optical source arranged adjacent said at least one wall for exciting fluorescence in a sample contained in the reaction chamber;

at least one optical detector, arranged to detect said fluorescence through said at least one wall;

characterized in that the system further comprises an array of variable volume chamber in communication with the reaction chamber for creating a pressure difference at the inlet port and/or the outlet port to thereby effect and/or restrict flow of a fluid sample to and/or from said port(s), wherein a variable volume chamber comprises a chamber having at least one wall formed from a flexible material, wherein depression and/or extension of the said at least one wall alters the volume of the variable volume chamber; and an actuator comprising an array of depression members, said array being arranged to be substantially in register with the array of variable volume chamber, wherein, in use, a depression member is brought into contact with the said at least one wall to cause depression thereof.

* * * * *